（12） United States Patent
Park et al.

(10) Patent No.: US 9,679,483 B2
(45) Date of Patent: Jun. 13, 2017

(54) SYSTEM AND METHOD FOR PROVIDING TRAFFIC INFORMATION

(71) Applicant: HYUNDAI MOTOR COMPANY, Seoul (KR)

(72) Inventors: Sung Hwan Park, Seongnam-si (KR); Tae Hyun Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 71 days.

(21) Appl. No.: 14/810,133

(22) Filed: Jul. 27, 2015

(65) Prior Publication Data

US 2016/0171889 A1   Jun. 16, 2016

(30) Foreign Application Priority Data

Dec. 12, 2014   (KR) ..................... 10-2014-0179662

(51) Int. Cl.
| | | |
|---|---|---|
| *G06F 17/00* | (2006.01) | |
| *G08G 1/0967* | (2006.01) | |
| *B60W 30/14* | (2006.01) | |
| *B60K 31/00* | (2006.01) | |

(Continued)

(52) U.S. Cl.
CPC ... *G08G 1/096725* (2013.01); *B60K 31/0058* (2013.01); *B60W 30/143* (2013.01); *G05D 1/0276* (2013.01); *G08G 1/012* (2013.01); *G08G 1/0112* (2013.01); *G08G 1/0129* (2013.01); *G08G 1/0133* (2013.01);
(Continued)

(58) Field of Classification Search
CPC . B60K 31/0058; B60W 30/143; B60W 30/14; G05D 1/0276; G08G 1/0112; G08G 1/012; G08G 1/0129; G08G 1/0133; G08G 1/0141; G08G 1/0145; G08G 1/096725; G08G 1/096741; G08G 1/096775

USPC ... 701/93, 23–24, 36, 53, 58, 59, 69–70, 79, 701/96, 110, 116–124, 33.8–33.9, 701/400–541; 340/988–996

See application file for complete search history.

(56) References Cited

U.S. PATENT DOCUMENTS

| | | | |
|---|---|---|---|
| 6,266,608 B1 * | 7/2001 | Pertz ................ | G08G 1/096716 340/901 |
| 7,355,528 B2 * | 4/2008 | Yamane ............. | G01C 21/3492 340/995.1 |

(Continued)

FOREIGN PATENT DOCUMENTS

| | | |
|---|---|---|
| JP | 4646990 B2 | 3/2011 |
| JP | 2014-189083 A | 10/2014 |

(Continued)

*Primary Examiner* — Muhammad Shafi
(74) *Attorney, Agent, or Firm* — McDermott Will & Emery LLP

(57) ABSTRACT

A traffic information providing system includes a traffic information collector configured to collect information on traffic flow. A traffic information generator is configured to detect a speed change point at which an average vehicle speed on a road changes based on the information on the traffic flow and to generate traffic information including position information on the speed change point and a target speed after a vehicle passes the speed change point. A traffic information provider is configured to transmit the traffic information to a vehicle controller for automatically controlling acceleration or deceleration of the vehicle based on the target speed.

12 Claims, 7 Drawing Sheets

(51) Int. Cl.
*G05D 1/02* (2006.01)
*G08G 1/01* (2006.01)

(52) U.S. Cl.
CPC ......... *G08G 1/0141* (2013.01); *G08G 1/0145* (2013.01); *G08G 1/096741* (2013.01); *G08G 1/096775* (2013.01)

(56) References Cited

U.S. PATENT DOCUMENTS

| | | | | |
|---|---|---|---|---|
| 7,609,176 | B2 * | 10/2009 | Yamane | G08G 1/0104 340/988 |
| 2006/0262662 | A1 * | 11/2006 | Jung | G08G 1/092 369/1 |
| 2010/0179748 | A1 * | 7/2010 | Choi | G01C 21/32 701/117 |
| 2011/0313644 | A1 * | 12/2011 | Grassi | G06K 9/723 701/119 |
| 2013/0138320 | A1 * | 5/2013 | Aso | B60W 30/16 701/96 |

FOREIGN PATENT DOCUMENTS

| | | | |
|---|---|---|---|
| KR | 2005-0098559 | * | 4/2007 |
| KR | 10-2011-0073233 | | 6/2011 |
| KR | 10-1393683 B1 | | 5/2014 |
| KR | 10-1428184 B1 | | 8/2014 |
| WO | 2011-036855 A1 | | 3/2011 |
| WO | 2011-074096 A1 | | 6/2011 |

* cited by examiner

FIG. 3

| FIELD VALUE | DESCRIPTION |
|---|---|
| ROAD ID | ID FOR ROAD IDENTIFICATION |
| AVERAGE SPEED | AVERAGE SPEED AT THE ROAD |
| SPEED CHANGE POINT SEQUENCE | SEQUENCE FOR POINT OF UNIT ROAD AT WHICH SPEED CHANGES |
| POSITION OF SPEED CHANGE POINT | POSITION INFORMATION ON A POINT OF UNIT ROAD AT WHICH SPEED CHANGES(INDICATES IN GPS OR A DISTANCE FROM A STARTING POINT OF THE ROAD) |
| TARGET SPEED | SPEED TO BE REACHED AFTER PASSING THROUGH SPEED CHANGE POINT |
| TIME PERIOD REQUIRED FOR REACHING TARGET SPEED | OPTIMUM TIME PERIOD FOR REACHING TARGET SPEED |
| COASTING INFORMATION | POSITION INFORMATION ON A SECTION AT WHICH COASTING IS POSSIBLE |

FIG. 4

| ROAD ID | 10111 |
|---|---|
| AVERAGE SPEED | 60 km/h |
| SPEED CHANGE POINT SQ NO | 1 |
| POSITION OF SPEED CHANGE POINT | 200m |
| TARGET SPEED | 90 km/h |
| TIME PERIOD REQUIRED FOR REACHING TARGET SPEED | 10 sec |
| COASTING INFORMATION | — |
| SPEED CHANGE POINT SQ NO | ... |
| ... | ... |

SYSTEM AND METHOD FOR PROVIDING TRAFFIC INFORMATION

CROSS-REFERENCE TO RELATED APPLICATION

This application claims the benefit of priority to Korean Patent Application No. 10-2014-0179662 filed in the Korean Intellectual Property Office on Dec. 12, 2014, the entire content of which is incorporated herein by reference.

TECHNICAL FIELD

The present disclosure relates to a system and a method for providing traffic information.

BACKGROUND

Importance on safe driving and fuel consumption has been emphasized in determining marketability of a vehicle.

Such fuel consumption increases and safe driving security decrease in hard acceleration or deceleration of the vehicle.

Recently, technologies for preventing the hard acceleration or deceleration of the vehicle by securing an adequate distance to a front vehicle with a distance sensor mounted to the vehicle have been developed. However, since the sensor mounted to the vehicle can only sense a short range and cannot sense traffic in front of the vehicle at a range of greater than 20 m, sensing the traffic in front of the vehicle for supporting the acceleration/deceleration of the vehicle has a limitation.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system and a method for providing traffic information having advantages of supporting improvement of fuel consumption and safe driving of a vehicle.

According to an exemplary embodiment of the present inventive concept, a traffic information providing system includes a traffic information collector configured to collect information on traffic flow. A traffic information generator is configured to detect a speed change point at which an average vehicle speed on a road changes based on the information on the traffic flow and to generate traffic information including position information on the speed change point and a target speed after a vehicle passes the speed change point. A traffic information provider is configured to transmit the traffic information to a vehicle controller at a vehicle for automatically controlling acceleration or deceleration of the vehicle based on the target speed.

According to another exemplary embodiment of the present inventive concept, a method for providing traffic information of a traffic information providing system may include collecting information on traffic flow by a traffic information collector. A speed change point at which an average vehicle speed on a road changes based on the information on the traffic flow is detected and traffic information including position information on the speed change point and a target speed after a vehicle passes the speed change point is generated by a traffic information generator. The traffic information is transmitted to a vehicle controller for automatically controlling acceleration or deceleration of the vehicle based on the target speed by a traffic information provider.

Accordingly, the traffic information providing system and method of the present disclosure can reduce fuel consumption and provide safe driving by providing a target speed and an optimum time period required for reaching the target speed in each section of roads.

BRIEF DESCRIPTION OF THE DRAWINGS

FIG. 3 illustrates a table showing an example of a traffic information data structure in accordance with an embodiment of the present inventive concept.

FIG. 4 illustrates a table showing an example of traffic information in accordance with an embodiment of the present inventive concept.

DETAILED DESCRIPTION OF THE EMBODIMENTS

The present disclosure will be described more fully hereinafter with reference to the accompanying drawings, such that persons in this field of art can easily carry out the present disclosure. However, the present disclosure may be embodied in different modes, and is not limited to the description of embodiments made herein.

Parts not relevant to the present disclosure will be omitted for describing the present disclosure clearly, and throughout the specification, identical or similar parts will be given the same reference numbers.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereafter, a system and method for providing traffic information in accordance with an embodiment of the present inventive concept will be described.

Figure 1:
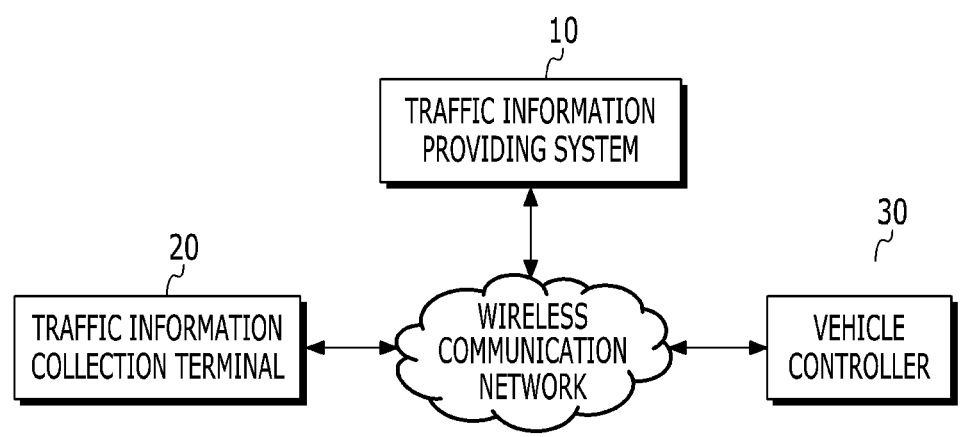
FIG. 1 schematically illustrates a block diagram of a traffic information providing service network in accordance with an embodiment of the present inventive concept.
Figure 2:
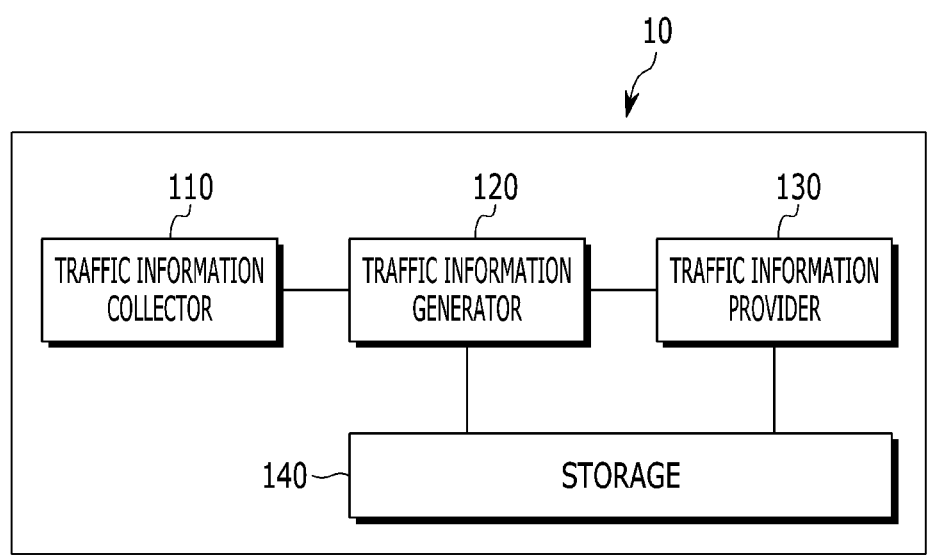
FIG. 2 schematically illustrates a block diagram of a traffic information providing system in accordance with an embodiment of the present inventive concept.
Figure 5:
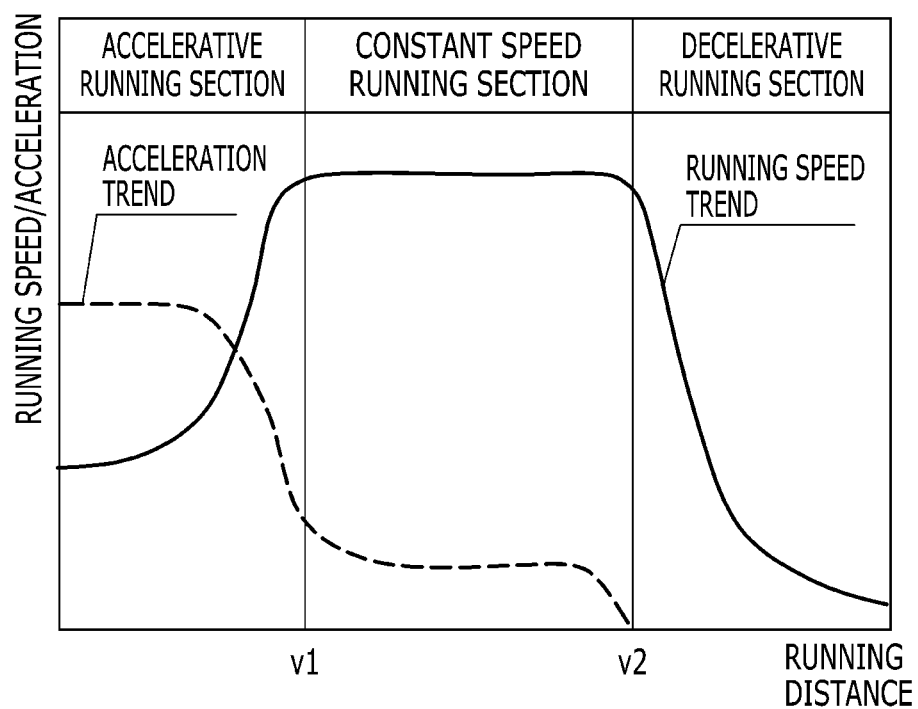
FIG. 5 illustrates a graph showing an example in which a traffic information providing system in accordance with an embodiment of the present inventive concept detects a speed change point.

FIG. 1 schematically illustrates a block diagram of a traffic information providing service network in accordance with an embodiment of the present inventive concept. FIG. 2 schematically illustrates a block diagram of a traffic information providing system in accordance with an embodiment of the present inventive concept. FIG. 3 illustrates a table showing an example of a traffic information data structure in accordance with an embodiment of the present inventive concept. FIG. 4 illustrates a table showing an example of traffic information in accordance with an embodiment of the present inventive concept. FIG. 5 illustrates a graph showing an example in which a traffic information providing system in accordance with an embodiment of the present inventive concept detects a speed change point.

Referring to FIG. 1, a traffic information providing system 10 collects information on traffic flow of roads through a traffic information collection terminal 20.

The information on the traffic flow of roads may include the position information on vehicles running on the roads.

The traffic information collection terminal 20 obtains position the information on the vehicles running on the roads, such as global positioning system (GPS) information, and provides the information to the traffic information providing system 10 through a wireless communication network. The traffic information collection terminal 20 may include a terminal mounted to a probe vehicle which collects the traffic information, or a mobile terminal positioned at a vehicle, such as a navigation system or a smart phone.

The traffic information providing system 10 collects information on the traffic flow of the roads from the traffic information collection terminals 20 connected with the wireless communication network. Further, the traffic information providing system 10 generates the traffic information based on the information collected from the traffic information collection terminal 20 and map data on the roads, and provides the same to a vehicle controller 30.

Referring to FIG. 2, the traffic information providing system 10 may include a traffic information collector 110, a traffic information generator 120, a traffic information provider 130, a storage 140, and so on.

The traffic information collector 110 may be periodically connected to the traffic information collection terminals 20 with the wireless communication network for collecting the information on traffic flow of the roads from the traffic information collection terminals 20. That is, the traffic information collector 110 may periodically collect position information on the vehicles running on the roads from the traffic information collection terminal 20.

The traffic information generator 120 may analyze information collected by the traffic information collector 110 and the map data to generate the traffic information.

The traffic information is generated for each of unit roads, and may include an average vehicle speed of each of the unit roads and reference data for vehicle control.

Referring to FIGS. 3 and 4, the traffic information the traffic information generator 120 generates may include road IDs for indentifying each of the roads, and an average vehicle speed on each of the roads. The reference data for vehicle control on each of the roads may include information on a speed change point at each of the roads, a target speed at each of running sections, and a time period for reaching the target speed, and coasting information including position information on a section in which coasting is possible.

Referring to FIG. 5, the speed change point denotes points v1 and v2 at which the average vehicle speed on the road changes more than a threshold value, or average acceleration v1 and v2 changes.

The traffic information generator 120 analyzes a moving track of each of the vehicles based on the position information on the vehicles received from the traffic information collection terminal 20, and may detect the speed change point at each of the roads based on an analysis result. When detecting the speed change point, the traffic information generator 120 performs filtering for removing information on an over-speed vehicle which exceeds the average vehicle speed in each of the roads by more than a preset value for removing unnecessary over-speed information.

Upon detection of the speed change point at each of the roads, the traffic information generator 120 may generate information on the detected speed change points.

The information on the speed change points may include a speed change point sequence, and the position information on the speed change points. That is, the information on the speed change points may include the speed change point sequence which indicates an order of the speed change point in the sequence on each of the roads, and the position information on each of the speed change points. In this case, the position information on each of the speed change points may be represented with the GPS information on each of the speed change points, or a distance to the speed change point from a starting point of the road. Referring to FIG. 4, a first speed change point of a road with an ID 10111 may be positioned 200 m from the road starting point.

Upon detecting the speed change point, the traffic information generator 120 may divide the unit road into a plurality of running sections with reference to the speed change points based on information collected from the traffic information collection terminal.

The running section is divided according to a running pattern (a speed or an acceleration pattern) of the vehicle running the section, taking two sequential speed change points as a starting point and an end point thereof, respectively. The running section may be divided into an accelerative running section, a constant speed section, a decelerative running section, a stagnant section, a stop section, and so on. Referring to FIG. 5, the accelerative running section denotes a section in which the speed gradually increases, the constant speed section denotes a section in which the vehicle runs at a constant speed, and the decelerative running section denotes a section in which the speed is gradually reduced.

If the running section is fixed based on the speed change point, the traffic information generator 120 may generate a target speed and a time period for reaching the target speed.

The target speed at each of the running sections is a speed the vehicle may reach after passing through the speed change point (the starting point of each of the running sections), corresponding to a speed a vehicle reaches for constant speed after passing through the speed change point. The time period for reaching the target speed may be an optimum time period until the vehicle reaches the target speed.

In a case of the accelerative running section, the target speed may be the constant vehicle speed after finishing acceleration. As an example, if an average vehicle speed in the constant speed section after the accelerative running section is 100 km/h, the target speed of the accelerative running section may be the average vehicle speed at the constant speed section, i.e., 100 km/h.

In a case of the accelerative running section, the time period required for reaching the target speed, an optimum time period for reaching the target speed, may be a time period for reaching the target speed while minimizing fuel consumption. In general, a level of power that the vehicle provides for a time period determines the fuel consumption, and hard acceleration and hard deceleration increase fuel consumption. Therefore, if a section after passing through the speed change point is the accelerative running section, the traffic information generator 120 may calculate an acceleration time period for reaching the target speed with gradual acceleration, instead of hard acceleration exceeding the threshold value, as the time period for reaching to the target speed.

During the constant speed section, the target speed may be an average vehicle speed at the constant speed section.

During the decelerative running section, the target speed may be the constant speed after finishing deceleration or a running speed in the stagnant/stop section. As an example, in a case of the decelerative running section for entering the stagnant section of 30 km/h, the vehicle speed at the stagnant section after the decelerative running section, i.e., 30 km/h, may be the target speed.

During the decelerative running section, the time period for reaching the target speed is a time period for reaching to the target speed by gradual deceleration or coasting. Here, it is required to reach the target speed before the vehicle reaches the starting point of the constant speed section or the stagnant/stop section after the decelerative running section for safe driving of the vehicle. Therefore, in the case of the decelerative running section, it is required to set a reaching time period such that a deceleration distance is adequately secured for reaching the target speed with the gradual deceleration or coasting. As an example, in the case of the decelerative running section in which the vehicle decelerates from 100 km/h to 30 km/h, it is required to reduce the vehicle speed by 70 km/h from 100 km/h to 30 km/h before the stagnant section in which the vehicle runs at a speed of 30 km/h starts, and a time period required for securing the deceleration distance required for reducing the speed by 70 km/h may be the time period for reaching the target speed.

When a safety distance is set based on a vehicle speed, the time period for reaching the target speed in the decelerative running section may be set to meet the safety distance corresponding to the target speed.

Coasting information may include position information on a section in which running is possible in a state the fuel is not supplied by a fuel cut.

The traffic information generator 120 may detect the section in which coasting is possible based on the average vehicle speed and the map data. As an example, if a section of a downhill road is the constant speed section on the map data, the traffic information generator 120 may detect it as the coasting section. Further, as an example, the decelerative running section may also be detected as the coasting section.

As previously described, if the traffic information is generated, the traffic information generator 120 may store the traffic information in the storage 140, by dividing the traffic information generated thus into unit roads or running sections.

Upon reception of a request for traffic information from the vehicle controller 30, the traffic information provider 130 may provide surrounding traffic information based on the present position of the vehicle having the vehicle controller 30 mounted thereto.

For this, the traffic information provider 130 periodically receives the present position of the traffic information provider 130 from the vehicle controller 30. Further, based on the present position of the vehicle controller 30 received from the vehicle controller 30, the traffic information provider 130 retrieves the surrounding traffic information on surrounding roads or surrounding running sections of the vehicle having the vehicle controller 30 mounted thereto from the traffic information stored in the storage 140. The traffic information provider 130 transmits the surrounding traffic information to the vehicle controller 30 through the wireless communication network. As an example, upon reception of the present position of the vehicle controller 30, the traffic information provider 130 may retrieve the traffic information on roads or running sections within a 2 km radius from the received position from the storage 140 and transmit the same to the vehicle controller 30.

The vehicle controller 30 periodically transmits the present position information of the vehicle controller 30 to the traffic information providing system 10 for reception of the traffic information. Upon reception of the traffic information of the surrounding roads of the vehicle controller 30 from the traffic information providing system 10, the vehicle controller 30 may automatically control a powertrain of the vehicle based on the received traffic information.

As an example, upon reception of the traffic information on the accelerative running section from the traffic information providing system 10, the vehicle controller 30 calculates an acceleration for reaching the target speed included in the traffic information from the present speed of the vehicle within a reaching time period included in the traffic information based on acceleration/deceleration characteristics of the vehicle. The vehicle controller 30 controls a powertrain of the vehicle to achieve the calculated acceleration.

As an example, upon reception of the traffic information on the constant speed section from the traffic information providing system 10, the vehicle controller 30 may control the powertrain of the vehicle to achieve the constant speed at the target speed included in the traffic information.

As an example, upon reception of the traffic information on the decelerative running section in front of the vehicle controller 30 from the traffic information providing system 10, the vehicle controller 30 calculates an acceleration for reaching the target speed from the present speed of the vehicle to the traffic information within the reaching time period included in the traffic information based on the acceleration/deceleration characteristics of the vehicle. The vehicle controller 30 controls the powertrain of the vehicle to achieve the calculated acceleration.

Upon reception of the traffic information on the coasting section from the traffic information providing system 10 of the road in front of the vehicle controller 30, the vehicle controller 30 may control the powertrain of the vehicle to achieve the coasting by a fuel cut.

Figure 6:
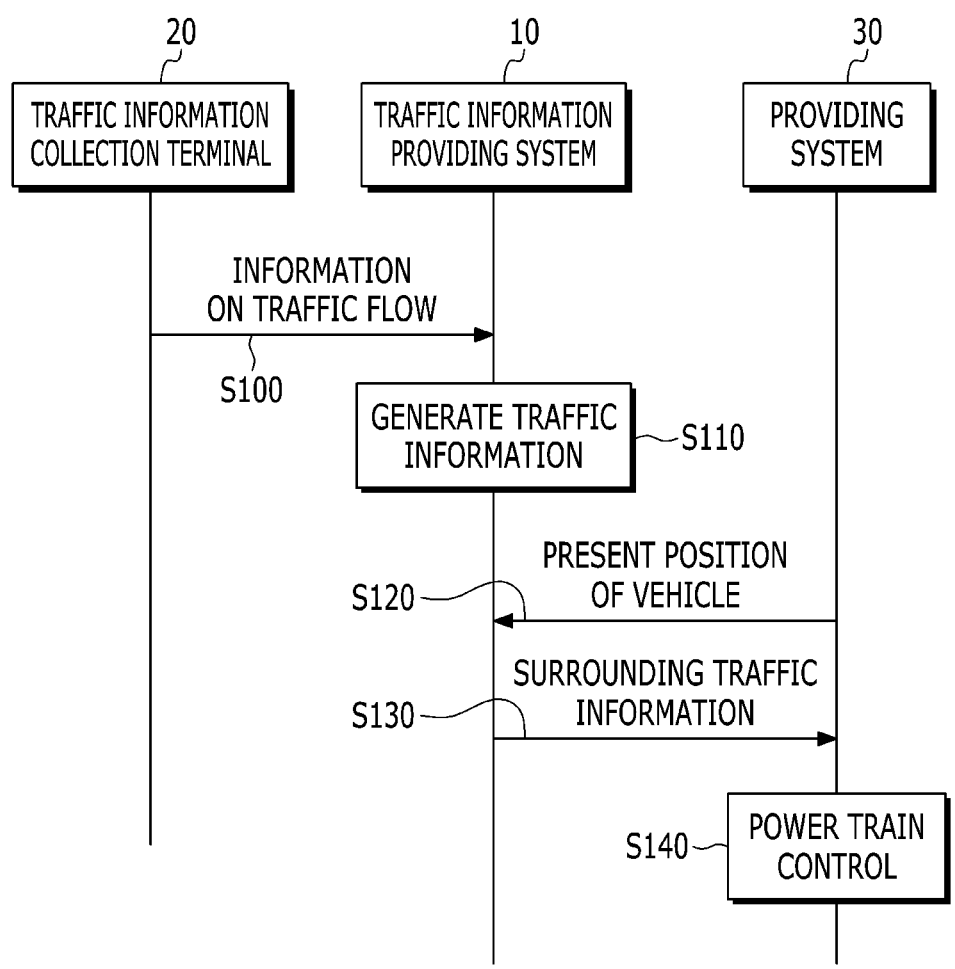
FIG. 6 illustrates a flowchart showing the steps of a method for providing traffic information in accordance with an embodiment of the present inventive concept.
Figure 7:
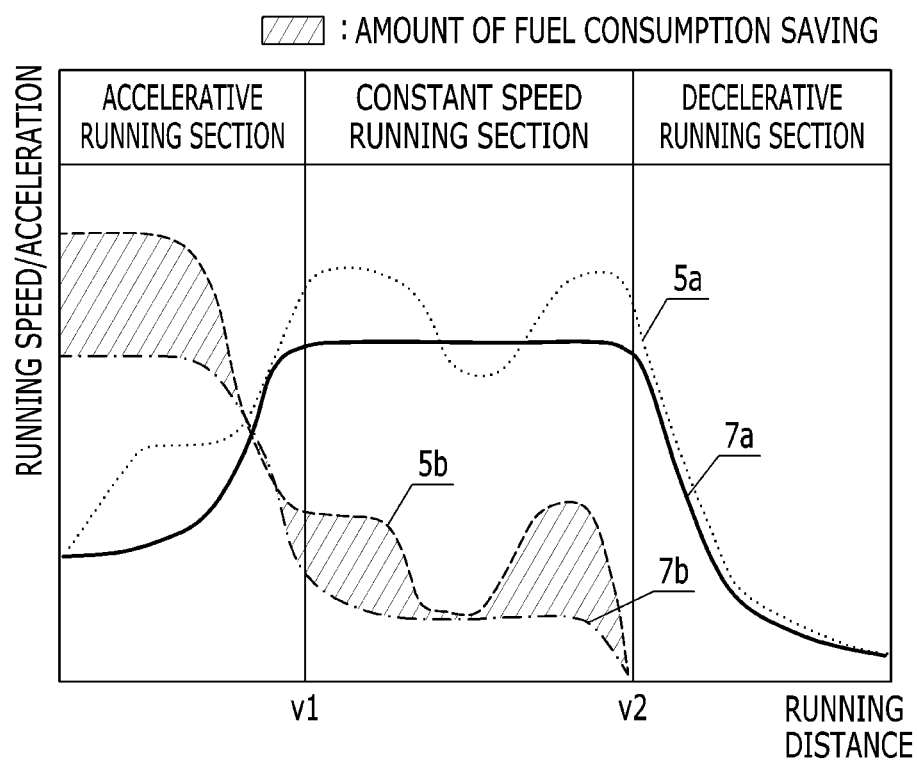
FIG. 7 illustrates a graph describing an effect of a method for providing traffic information in accordance with an embodiment of the present inventive concept.

FIG. 6 illustrates a flowchart showing the steps of a method for providing traffic information in accordance with an embodiment of the present inventive concept. FIG. 7 illustrates a graph provided for describing an effect of a method for providing traffic information in accordance with an embodiment of the present inventive concept.

Referring to FIG. 6, a traffic information collection terminal 20 periodically collects information on traffic flow of roads and transmits the information to a traffic information providing system 10 (S100).

In the step S100, the information on the traffic flow of roads may include the present position of the traffic information collection terminal 20, i.e., position information corresponding to the present position of the vehicle having the traffic information collection terminal 20 mounted thereto.

The traffic information providing system 10 periodically receives the information on the traffic flow of roads from the traffic information collection terminals 20, and generates traffic information by using the received information received (S110).

In the step S110, the traffic information is generated for each of unit roads, and may include identification information on each of the unit roads (Road ID), an average speed at each of the roads, speed change point information at each of the roads, a target speed at each of running sections and a time period for reaching the target speed, and coasting information including position information on a section at which coasting is possible.

The traffic information providing system 10 periodically receives the position information including the present position from the vehicle controller 30 (S120). The traffic information providing system 10 transmits surrounding traffic information of the vehicle having the vehicle controller 30 mounted thereto to the vehicle controller 30 based on the position information received in the step S120 (S130).

In the step S130, in order to minimize a transmission data capacity, the traffic information providing system 10 may select only the traffic information corresponding to surrounding roads or surrounding running sections of the vehicle having the vehicle controller 30 mounted thereto from the traffic information already generated based on the present position of the vehicle controller 30 received from the vehicle controller 30, and transmit the selected traffic information to the vehicle controller 30.

The vehicle controller 30 receives the surrounding information from the traffic information providing system 10 and controls a powertrain of the vehicle (S140).

According to the foregoing description, the traffic information providing system 10 sets the target speed and the time period required for reaching the target speed in each of the running sections by reflecting the traffic flow of the roads, and transmits the traffic information including the target speed and the time period required for reaching the target speed to the vehicle controller 30. Since the vehicle controller 30 may perform appropriate acceleration or deceleration according to the traffic flow of a front road and avoid hard acceleration and hard deceleration, the fuel consumption is reduced and safe driving is achieved.

FIG. 7 illustrates a comparative graph for comparing a vehicle speed 5a in a case a powertrain of a vehicle is controlled by a driver in the related art and a vehicle driving torque 5b thereof, to a vehicle speed 7a in a case a vehicle powertrain is controlled based on traffic information in accordance with an embodiment of the present inventive concept provides and a vehicle driving torque 7b thereof.

Referring to FIG. 7, when a vehicle powertrain is controlled based on traffic information from a traffic information providing system 10, a vehicle may avoid unnecessary acceleration or deceleration by grasping a target speed on the road in front of the vehicle in advance and by appropriately controlling acceleration or deceleration based on the traffic information. Thus, unnecessary fuel consumption is reduced to improve mileage.

The method for providing traffic information in accordance with the embodiment of the present inventive concept may be run with software. When run by software, means of the present disclosure are code segments for running a required work. A program or the code segments may be stored in a processor decoding function medium or may be transmitted by a computer data signal coupled to a carrier wave at a transmission medium or a communication network.

A recording medium the computer may read includes all kinds of recording devices to which data which may be read by a computer system is stored. As an example of the recording devices the computer may read, there are ready-only memory (ROM), random-access memory (RAM), CD-ROM, DVD_ROM, DVD_RAM, magnetic tape, floppy disk, hard disk, optical data storage device, and so on. The recording medium the computer may read may have a code stored therein and run thereby, which may be distributed to computers connected with a network and may be read by the computer with a distribution system.

The drawings referred up to now and the detailed description of the present invention described, and thus are illustrative of the present invention and are used only for describing the present invention, but not for confining meaning or limiting scope of the present invention recited in the claims. Therefore, a person skilled in this field of art may easily select from and replace them.

Further, a person of ordinary skill in the art may omit some of the constituent elements described in this specification without degradation of performance or add constituent elements to the specification for improving the performance. Moreover, the person of ordinary skill in the art may also change an order of the steps of a method described in the specification according to a process environment or equipment. Therefore, the scope of the present invention is required to be determined, not by the mode of embodiment described herein, but by equivalents.

What is claimed is:

1. A traffic information providing system comprising:
a traffic information collector configured to collect information on traffic flow;
a traffic information generator configured to detect a speed change point at which an average vehicle speed on a road changes based on the information on the traffic flow and to generate traffic information including position information on the speed change point and a target speed after a vehicle passes the speed change point; and
a traffic information provider configured to transmit the traffic information to a vehicle controller for automatically controlling acceleration or deceleration of the vehicle based on the target speed,
wherein the traffic information generator detects a coasting section at which coasting is possible based on the information on the traffic flow and map data, and generates the traffic information to include the position information on the coasting section.

2. The system of claim 1, wherein the traffic information generator calculates the target speed based on the average vehicle speed in a constant speed section after passing the speed change point.

3. The system of claim 1, wherein the traffic information further includes a time period for reaching the target speed.

4. The system of claim 3, wherein the traffic information generator calculates an acceleration time period in an acceleration section for reaching the target speed without hard acceleration as a reaching time period.

5. The system of claim 3, wherein the traffic information generator calculates a reaching time period to obtain a safe distance corresponding to the target speed in a deceleration section.

6. The system of claim 1, wherein the traffic information provider receives a present position of the vehicle from the vehicle controller, and transmits the traffic information on surrounding roads selected based on the present position of the vehicle to the vehicle controller.

7. A method for providing traffic information using a traffic information providing system, the method comprising steps of:
collecting, by a traffic information collector, information on traffic flow;
detecting, by a traffic information generator, a speed change point at which an average vehicle speed on a road changes based on the information on the traffic flow;

generating, by a traffic information generator, traffic information including position information on the speed change point and a target speed after a vehicle passes the speed change point;

transmitting, by a traffic information provider, the traffic information to a vehicle controller for automatically controlling acceleration or deceleration of the vehicle based on the target speed; and detecting a coasting section at which coasting is possible based on the information on the traffic flow and map data, wherein the traffic information further includes the position information on the coasting section.

8. The method of claim 7, further comprising a step of calculating the target speed based on an average vehicle speed in a constant speed section after passing through the speed change point.

9. The method of claim 7, wherein the traffic information further includes a time period for reaching the target speed.

10. The method of claim 9, further comprising a step of calculating an acceleration time period in an acceleration section for reaching the target speed without hard acceleration as a reaching time period.

11. The method of claim 9, further comprising calculating a reaching time period to obtain a safe distance corresponding to the target speed in a deceleration section.

12. The method of claim 7, further comprising a step of receiving a present position of the vehicle from the vehicle controller, wherein the step of transmitting the traffic information includes transmitting the traffic information on surrounding roads selected based on the present position of the vehicle to the vehicle controller.

* * * * *